Dec. 4, 1928.
C. T. McGILL
1,694,332
BASE EXCHANGE WATER SOFTENER, SALT POT ATTACHMENT
Filed Nov. 19, 1925  2 Sheets-Sheet 1
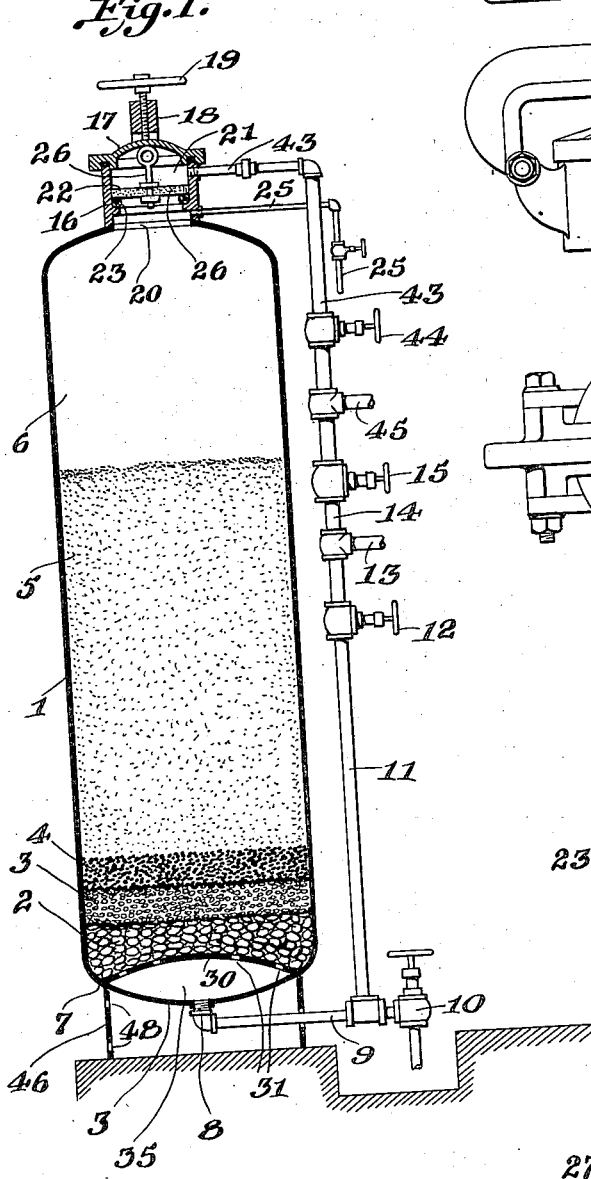
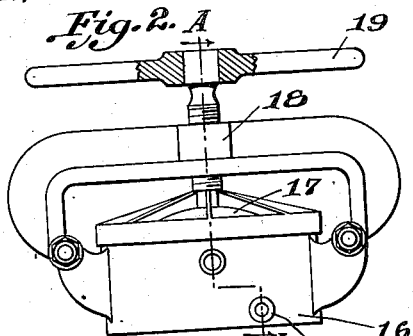
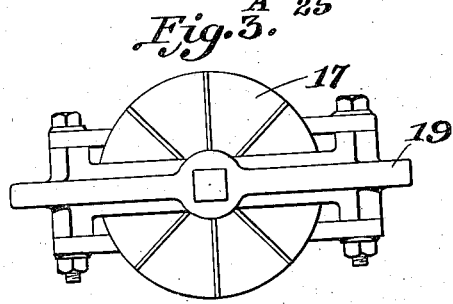
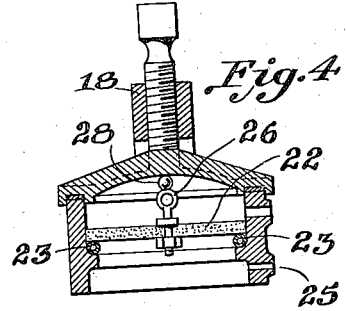
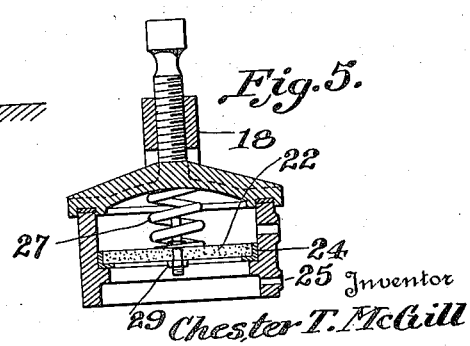
Inventor
Chester T. McGill
By Mason Fenwick Lawrence
Attorneys Dec. 4, 1928.　　　　　　　1,694,332
C. T. McGILL
BASE EXCHANGE WATER SOFTENER, SALT POT ATTACHMENT
Filed Nov. 19, 1925　　　2 Sheets-Sheet 2
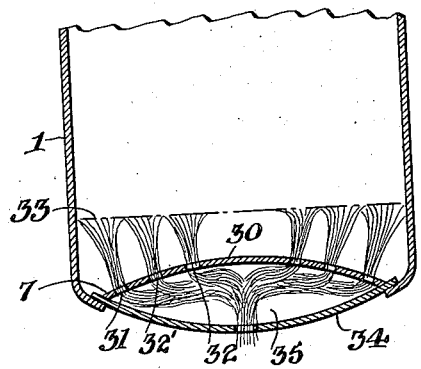
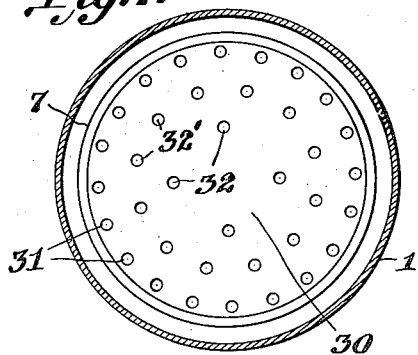
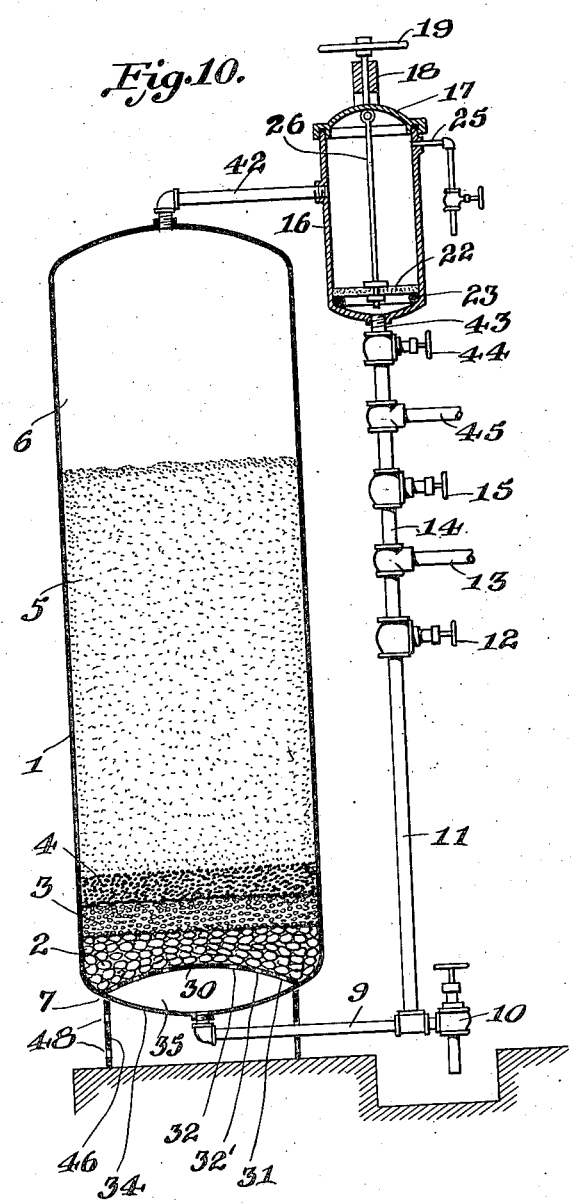
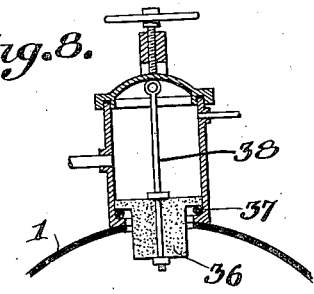
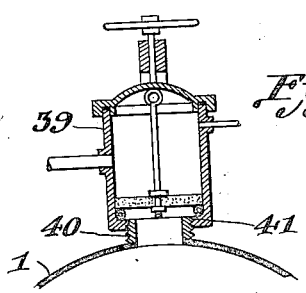
Inventor
Chester T. McGill
By Mason Fenwick Lawrence
Attorneys Patented Dec. 4, 1928.

1,694,332

UNITED STATES PATENT OFFICE.

CHESTER T. McGILL, OF ELGIN, ILLINOIS, ASSIGNOR TO REITER COMPANY, OF ELGIN, ILLINOIS, A CORPORATION OF ILLINOIS.

BASE-EXCHANGE WATER SOFTENER, SALT-POT ATTACHMENT.

Application filed November 19, 1925. Serial No. 70,154.

This invention relates to improvements in base exchange water softeners.

An object of this invention is to provide means for preventing the scum and base exchange mineral fines from entering the service pipe.

Another object of this invention is to provide means for regulating the flow rate, preferably in the form of a loosely positioned element within the saltpot connected with the base exchange water softener container.

A further object is to provide a convenient and simple method or device for adding the salt solution at the regenerating periods. For this purpose, a filtering material in the form of a porous plate or filter screen, or any filtering means within the saltpot may be provided having suitable gaskets or means of slidably positioning the plate or filtering material within the saltpot.

Another object of this invention is to provide means for placing the saltpot and filter at the side of the base exchange mineral container, thereby enabling the softened water to pass into the saltpot in a manner allowing the scum and sediment to accumulate in the top of the saltpot and the fine exchange mineral to accumulate near the bottom of the saltpot.

One of the objects is to provide means for drawing the scum and sediment from the saltpot.

Further objects of this invention will appear in the following detailed description of the device and as disclosed in the two sheets of drawings herewith made a part of this application.

In the drawings,

Fig. 1 illustrates a vertical side sectional view of the base exchange water softener in diagrammatic form showing the saltpot in combination thereto.

Fig. 2 represents a vertical side view of the saltpot detached from the base exchange water softener container.

Fig. 3 illustrates a plan view of the saltpot disclosed in Fig. 2.

Fig. 4 represents a sectional vertical view of the saltpot taken on line A—A of Fig. 2.

Fig. 5 illustrates a vertical sectional view of the saltpot attachment in a modified form over Fig. 4.

Fig. 6 represents a vertical sectional view of the lower portion of the base exchange water softener container as disclosed in Fig. 1, illustrating particularly the flow of the water through the base portion of the container.

Fig. 7 illustrates a plan view of the perforated diaphragm plate connected with the lower portion of the base exchange water softener disclosed in Fig. 1.

Fig. 8 illustrates a vertical sectional view of the saltpot in a modified form over Fig. 4.

Fig. 9 represents a sectional elevational view of a modified form of saltpot as attached to the base exchange water softener container.

Fig. 10 illustrates a sectional elevational diagrammatic view of the base exchange water softener having the saltpot connected thereto in a modified form to that disclosed in Fig. 1.

Similar numerals designate identical parts in the different figures of the drawings.

Numeral 1 designates the container of the base exchange water softener holding therein the filtering material comprising a lower layer 2, preferably of gravel, a layer of quartz 3, and a finer layer of quartz 4 or other suitable filtering material. Above this layer 4 is positioned a proper quantity of base exchange mineral 5, allowing a free-board space 6 between the upper portion of the container 1 and the top of the base exchange mineral 5. Positioned at the bottom of the container 1 is a suitably formed perforated plate 7 upon which the filtering material is adapted to be held in position.

Leading from a suitable point in the container casing 1, preferably from the bottom thereof as at 8, is a connection line 9 leading to drain valve 10 and raw water supply line 11 through a raw water supply valve 12, to a T 13 leading to the raw water city mains or supply. From the raw water supply T 13 is a connecting nipple 14 leading to the by-pass valve 15, the by-pass valve 15 obviously being closed during the softening operation.

Over an opening suitably positioned in the base exchange water softener container 1 at the top thereof, is adapted to be placed a saltpot attachment 16. This saltpot attachment 16 may be designed to connect with the container in any suitable manner, such as disclosed in the Figures 1, 8, 9 and 10.

Numerals 17, 18 and 19 designate parts of the saltpot attachment which may be of any suitable construction.

In operation the soft water having been filtered through the materials 2, 3, 4 and 5, leaves the free-board space 6 through an aperture 20, located preferably in the upper portion of the base exchange container 1, the aperture 20 being of a size sufficient to enable the proper amount of filtering material such as gravel, mineral and the like to be supplied to a tank container 1. After the soft water leaves the free-board space 6, it enters through the aperture 20 into the salt supply nozzle 21 which is constructed in such a manner that it acts as a damper to keep all the scum, fines and the like out of the service pipe 43 by means of a porous plate or screen as at 22. The element 22 may be of any suitable material, and is preferably provided with a packing 23 comprising any desirable shape and formed of rubber material or otherwise as disclosed at 23 and 24 in Figures 4 and 5.

It is to be understood that any suitable form of gaskets may be used in making the porous plate 22 slidably positioned with the minimum amount of clearance between its edges and the saltpot container 16.

Any impurities and scum that may accumulate below the porous plate 22 can readily be removed by means of a blow-down pipe or outlet as disclosed by numeral 25.

The means for holding the plate or screen 22 in place may be of any suitable type, such as an eyebolt as at 26, or a spring as at 27. In the eyebolt arrangement as disclosed in Fig. 1, a space between the cap and eyebolt, is disclosed, thereby allowing for a certain movement of the plate 22.

In the eyebolt arrangement disclosed in Fig. 4 a rubber ball or other suitable material is shown at 28, fastened to the cover or cap 17 of the saltpot 16, thereby permitting of a certain amount of resiliency to the action of the porous plate 22.

In Fig. 5 a spring 27 is disclosed held in place by means of a pin 29 fastened to the plate 22. It is apparent from the description of the arrangement of the plate 22 that it may easily be removed and cleaned whenever regeneration becomes necessary, thereby effecting a very marked improvement over arrangements of similar elements now in common use. Furthermore, the size and grade of mesh or otherwise of the filtering plate or screen 22 determines the rate of flow in the softener and acts as a regulator thereto.

In this invention the supporting perforated plates 7 as disclosed in Figures 1, 6 and 7 commonly used in the construction of water softeners, are combined in this invention in such a manner as to provide three distinctive features in novel and useful combination. In the first place, the plate 7 acts as a distributing plate, in the second place it acts as a support for the filtering material and in the third place it provides an efficient baffle plate.

It is readily apparent that a jet of water may be projected through the inlet opening 8 of the bottom of the container 1 and will impinge against the central space 30 of this plate where there are no openings. Obviously, the stream of water is baffled at this point and deflected toward the ends of the plate where the lowest row of holes 31 are located.

At the end of the plate 7 the small jets flowing through the holes 31 have the greatest impulse caused by the reaction in the corners of the plate and head. These impulses as are readily apparent diminish toward the baffle plate center. Between the baffle plate portion 30 and the lowest row of holes 31, are other holes or openings 32 and 32' through which jets of incoming liquid will flow with decreased pressure, this action or phenomena is indicated clearly in the diagrammatic view as disclosed in Fig. 6.

The arrangement herewith described of the plate 7 practically creates a discharge at the top surface of the perforated plate 7 in such a manner that the jets of water terminate at the same level and therefore the rise of the water or flow into the filtering materials 2, 3, and 4 will be on a uniform level as clearly shown at line 33 in Fig. 6.

It is to be understood that the size and number of holes in the perforated plate 7 have a certain relation to the influx and discharge conditions of flow. The plate 7 may or may not cover the bottom of the tank container, or it may extend over only a portion thereof.

In addition to the functions and advantages of the perforated plate 7 as described above, it may be stated that it is also adapted to support the filtering material such as gravel, quartz and mineral bed and forms with a bottom portion of the tank container 34 a precipitating chamber 35 wherein those impurities which are arrested by the plate 7 and otherwise may be accumulated for removing through any suitable means.

In Fig. 8, numeral 36 designates a modified form of a porous plate, adapted to be properly shaped for positioning on suitable packings 37 and held in place by means of an eyebolt 38 or otherwise as described above.

In Fig. 9 a modified form of saltpot 39 is disclosed adapted to be attached in a suitable manner to a projection 40 of the base exchange water softener container 1. The saltpot 39 may be attached to the container 1 by any means such as threaded portions as at 41.

In Fig. 10 of the drawings, is disclosed a modified form of connecting the saltpot to the tank container 1. The connection from the container may be designated by the numeral 42, the connection 42 being adapted to enter the saltpot at a point between the upper surface of the plate 22 and the upper end of the saltpot 16, thereby allowing the soft water to enter the saltpot, and enabling the softened water to pass into the saltpot in a manner allowing the scum and sediment to accumulate in the top of the saltpot and fine exchange mineral to accumulate near the bottom of the saltpot.

Leading from the saltpot 16, in Fig. 1 at a point between the upper surface of the plate 22 and the under surface of the cap 17 of the saltpot is a soft water connection 43 leading through the water valve 44 and an outlet line 45.

In Fig. 10, leading from the saltpot 16 at a point preferably from the lower portion thereof, is a soft water connection 43, which leads through the water valve 44, and to an outlet line 45.

In the process of regenerating when using the modified form of the apparatus as disclosed in Fig. 10, the valve 15 is opened and valve 12 closed. Valve 10 is opened; this carries the hard water through valve 44 connecting line 43 into the bottom of the saltpot 16, back-washing the filter plate 22 and carrying the fines into lines 42, hence into the free-board space 6 of container 1. The light scum, obviously, will remain at the top of the saltpot 16 and may be drawn off through a drain connection 25.

In the process of regeneration as practiced in this invention in Fig. 10, the valves 12 and 44 are closed. The valve 10 is opened, which releases the pressure from the system. The set screw 19 is loosened and the element 18 removed, a cap 17 removed and the salt added on top of the porous plate 22 in saltpot 16. The cap 17 and the yoke 18 are replaced and the cap securely sealed by means of the element 19, the valve 44 is opened, which carries the hard water through line 43 into the saltpot 16, thereby dissolving the salt into a brine and carrying it through the element 42 into free-board space 6, down through the mineral 5, thereby forming the exchange from calcium to sodium in the base exchange mineral, and allowing the hardness to drain out through drain valve 10. When sufficient time and amount of brine solution has passed through the base exchange mineral and drained from valve 10, the valve 10 is closed, valve 44 closed and valve 12 opened. This reverses the current of hard water to the bottom of the softener and by opening line 25 of saltpot 16, the flow of water will pass up from container 1, base exchange mineral 5, through free-board space 6 connecting element 42 to saltpot 16 and hence to drain at point 25. This carries the suspended sediment and removes any remaining salt solution or brine from system when the water passing from 25 registers soft, valve 25 is closed, valve 15 closed and 44 opened. This connects the mains with the soft water and the softener is again in operation.

In the process of regeneration as disclosed in Fig. 1, the method is very similar to that described above in the arrangement of Fig. 10 with the exception that filter plate 22 is removed and the salt added through the saltpot 16, opening 20 into free-board space 6 of container 1. The filter plate 22 is then cleaned from any sediment and replaced and the cap 17, yoke 18 and set screw 19 are repositioned.

Numeral 46 designates a stand, preferably made in the form of a ring having suitable holes located therein as at 47, for the purpose of admitting pipe connections such as 9, or the like. This stand 46 preferably is supplied with suitable vent holes as at 48. It being understood that the ring stand 46 in this invention is a separate and distinct element from the container 1 and so located at the base of the container that the container may be adjustably positioned thereon. The ring may be composed of any suitable material.

What I claim is:

1. In a water softener having a fill nozzle attachment, the fill nozzle serving as a soft water outlet, a removable filter within the fill nozzle for the purpose of filtering the softened water.

2. The combination of a water softener, of a fill nozzle attachment, the fill nozzle serving as a soft water outlet, of a removable filter within the fill nozzle, means for slidably positioning the filter within the fill nozzle, for the purpose of retaining the base exchange mineral from being carried into the service lines.

3. In a water softener, a fill nozzle attachment, a filter within the fill nozzle, means for slidably positioning the filter within the fill nozzle, thereby forming a self adjusting seal, the filter being easily removable at regenerating periods.

4. In a water softener, a fill nozzle attachment, a filter within the fill nozzle, means for slidably positioning the filter within the fill nozzle, thereby forming a self adjusting seal, the filter being easily removable at regenerating periods, means consisting of a suitable holder for the filter, and flexible gaskets for maintaining a seal between the filter and the fill nozzle.

5. In a water softener, a fill nozzle attachment, a filter within the fill nozzle, means for slidably positioning the filter within the fill nozzle, thereby forming a self adjusting seal, the filter being easily removable at regenerating periods, the means consisting of a movable support for the filter, and flexible gaskets for maintaining a seal between the filter and the fill nozzle, removable resilient means for holding the filter in position thereby making it convenient for removing filter for the insertion of salt.

6. In a water softener having a fill nozzle attached thereto, a porous plate slidably positioned within the fill nozzle thereby providing a flow regulator for the water.

7. In a water softener having a fill nozzle attached thereto, a removable porous plate slidably positioned within the fill nozzle, means for operating the porous plate as a water flow regulator, comprising a means for slidably positioning the porous plate within the fill nozzle, and resiliently maintaining the porous plate in position, and means for draining the scum and sediment from the fill nozzle below the porous plate.

8. In a water softener having a fill nozzle attached thereto, a porous plate slidably positioned within the fill nozzle, means for operating the porous plate as a flow regulator, comprising a means for slidably positioning the porous plate within the fill nozzle, and resiliently maintaining the porous plate in position, means for draining the scum and sediment from the fill nozzle, consisting of a service drain attached to the fill nozzle below the porous plate.

9. In a water softener having a fill nozzle attached thereto, a removable porous plate slidably positioned within the fill nozzle, means for operating the porous plate as a water flow regulator, comprising a means for slidably positioning the porous plate within the fill nozzle, and resiliently maintaining the porous plate in position, means for draining the scum and sediment from the fill nozzle, consisting of a service drain attached to the fill nozzle at a suitable point, the porous plate being adapted to prevent fines from entering the soft water lines.

10. In a base exchange water softener having a fill nozzle attachment thereto, a porous filtering plate slidably positioned within the fill nozzle, and means for passing the soft water from the fill nozzle.

11. A base exchange water softener having a fill nozzle adapted to serve as a soft water outlet, a removable filter within the fill nozzle for the purpose of filtering the softened water, means for slidably positioning the filter within the fill nozzle for the purpose of retaining the base exchange mineral from being carried into the service lines.

12. A base exchange water softener having a fill nozzle adapted to serve as a soft water outlet, a removable filter within the fill nozzle for the purpose of filtering the softened water, means for slidably positioning the filter within the fill nozzle for the purpose of retaining the base exchange mineral from being carried into the service lines, thereby forming a self adjusting seal, the filter being easily removable at regenerating periods.

13. A base exchange water softener having a fill nozzle adapted to serve as a soft water outlet, a removable filter within the fill nozzle for the purpose of filtering the softened water, means for slidably positioning the filter within the fill nozzle for the purpose of retaining the base exchange mineral from being carried into the service lines, and resilient means for holding the filter in position.

14. A base exchange water softener having a fill nozzle adapted to serve as a soft water outlet, a removable filter within the fill nozzle for the purpose of filtering the softened water, means for slidably positioning the filter within the fill nozzle for the purpose of retaining the base exchange mineral from being carried into the service lines, and means for draining the scum and sediment from the fill nozzle, consisting of a service drain attached to the fill nozzle.

15. A base exchange water softener comprising a container, base exchange mineral in the container, a fill nozzle, a slidably positioned filter within the fill nozzle, a perforated plate within the container adapted to maintain a uniform flow of liquid into the mineral, the plate having baffles along the outer edge and center portion thereof, and perforations intermediate the outer edge and center position thereby enabling the center portion of the plate to act as a baffle.

In testimony whereof I affix my signature.

CHESTER T. McGILL.